United States Patent
Rock et al.

(10) Patent No.: US 8,361,281 B2
(45) Date of Patent: Jan. 29, 2013

(54) DESALINIZATION APPARATUS AND METHOD

(75) Inventors: Kelly P. Rock, Henderson, NV (US); Bruce E. Nadeau, Jr., Las Vegas, NV (US)

(73) Assignee: LyteSyde, LLC, Miami Beach, FL (US)

( * ) Notice: Subject to any disclaimer, the term of this patent is extended or adjusted under 35 U.S.C. 154(b) by 823 days.

(21) Appl. No.: 12/190,878

(22) Filed: Aug. 13, 2008

(65) Prior Publication Data

US 2010/0038229 A1    Feb. 18, 2010

(51) Int. Cl.
*B01D 1/00* (2006.01)
*B01D 3/00* (2006.01)
*B01D 3/42* (2006.01)
*C02F 1/04* (2006.01)
*C02F 1/38* (2006.01)

(52) U.S. Cl. ......... 203/10; 159/16.1; 159/47.1; 159/6.1; 203/1; 203/2; 203/49; 203/DIG. 17; 210/151; 210/787; 261/128

(58) Field of Classification Search .................. 159/6.1, 159/16.1, 44, 47.1; 203/1, 2, 10, 49, 71, 203/DIG. 17; 210/151, 767, 787, 806; 261/128, 261/110
See application file for complete search history.

(56) References Cited

U.S. PATENT DOCUMENTS

| | | | | |
|---|---|---|---|---|
| 4,040,973 A * | 8/1977 | Szivos et al. | ..................... | 588/20 |
| 4,362,627 A * | 12/1982 | Fly et al. | ....................... | 210/676 |
| 5,078,880 A | 1/1992 | Barry | | |
| 5,176,799 A * | 1/1993 | Roe et al. | ................... | 202/185.3 |
| 6,110,368 A | 8/2000 | Hopkins et al. | | |
| 6,699,369 B1 * | 3/2004 | Hartman et al. | ................ | 203/11 |
| 6,811,690 B2 | 11/2004 | Arnaud | | |
| 7,897,019 B2 * | 3/2011 | Akers | ............................ | 203/10 |
| 2008/0047291 A1 * | 2/2008 | Colwell | .......................... | 62/314 |

FOREIGN PATENT DOCUMENTS

WO    WO 2007/133771 A2    11/2007

* cited by examiner

*Primary Examiner* — Bruce H Hess
(74) *Attorney, Agent, or Firm* — Holland & Hart

(57) ABSTRACT

There is disclosed a desalinization apparatus, and methods related to desalinization. In an embodiment, a desalinization apparatus includes at least one port for receiving airflow therethrough, at least one port for receiving salt water therethrough, at least one output for providing outflow of pure water vapor, and at least one output for proving outflow of a mixture of water, salt and air; and a plurality of chambers for evaporating the salt water into the airflow, at least one of the chambers forming a plurality of ports arranged in a plurality of rows. In an embodiment, a method includes providing airflow to a desalinization apparatus; providing salt water to the desalinization apparatus; forming a vortex in the airflow to evaporate water vapor from the salt water; and providing the water vapor in the airflow to a condenser so as to obtain pure water.

27 Claims, 16 Drawing Sheets

DESALINIZATION APPARATUS AND METHOD

BACKGROUND OF THE INVENTION

Many types of devices have been developed over the years for the purpose of converting liquids or aerosols into gas-phase fluids. Many such devices have been developed, for example, to desalinate water so as to remove excess salt and other minerals from water. Saline water, or salt water, generally contains a significant concentration of dissolved salts. Seawater has a salinity of roughly 35,000 ppm, or 35 g/L. Seawater is not portable nor suitable for irrigating crops.

Water may be desalinated in order to be converted to fresh water suitable for human consumption or irrigation. Large-scale desalination typically uses large amounts of energy as well as specialized, expensive infrastructure. As such, it is very costly to use desalinated water instead of fresh water from rivers or groundwater.

Three methods of desalination include vacuum distillation, reverse osmosis and multi-stage flash.

In vacuum distillation, water is boiled at less than atmospheric pressure. Boiling of a liquid occurs when the vapor pressure equals the ambient pressure and vapor pressure increases with temperature. Due to the reduction in temperature, energy is saved.

Reverse osmosis technology involves semi-permeable membranes and pressure to separate salts from water. Less energy may be used than thermal distillation. However, desalination remains energy intensive.

SUMMARY OF THE INVENTION

In an embodiment, there is provided a desalinization apparatus, comprising a first end and a second end in opposition to one another, a line between the first end and the second end forming an axis, the first end forming at least one port for receiving airflow therethrough and at a pressure higher than an ambient atmospheric pressure, the first end forming at least one port for receiving salt water therethrough and at a pressure higher than the ambient atmospheric pressure, the second end forming at least one output for providing outflow of pure water vapor, and the second end forming at least one output for proving outflow of a mixture of water, salt and air; and at least one tube casing extending between the first end and the second end, the tube casing enclosing a plurality of chambers for evaporating the salt water into the airflow, at least one of the chambers forming a plurality of passageways arranged substantially parallel to the axis between the first end and the second end, forming a plurality of ports from the passageways, and the ports arranged in a plurality of rows substantially parallel to one another and substantially perpendicular to the axis between the first end and the second end.

In another embodiment, there is provided a method, comprising providing airflow to a desalinization apparatus at a pressure higher than an ambient atmospheric pressure; providing salt water to the desalinization apparatus at a pressure higher than an ambient atmospheric pressure; forming a vortex in the airflow to evaporate water vapor from the salt water; and providing the water vapor in the airflow to a condenser so as to obtain pure water.

Other embodiments are also disclosed.

BRIEF DESCRIPTION OF THE DRAWINGS

The accompanying drawings illustrate certain embodiments discussed below and are a part of the specification.

Throughout the drawings, identical reference characters and descriptions indicate similar, but not necessarily identical elements.

DETAILED DESCRIPTION

Illustrative embodiments and aspects are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

As used throughout the specification and claims, the words "including" and "having," as used in the specification, including the claims, have the same meaning as the word "comprising."

Figure 1:
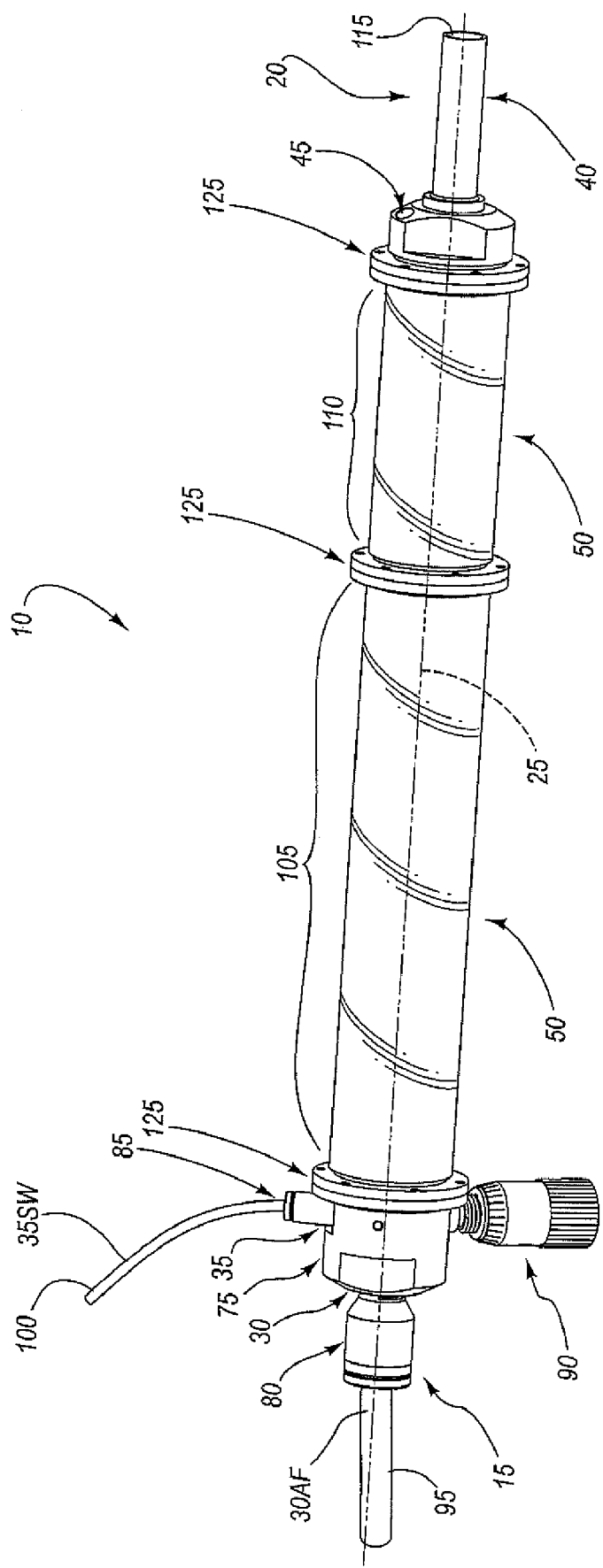
FIGS. 1-3 illustrate perspective views of a desalinization apparatus.
Figure 2:
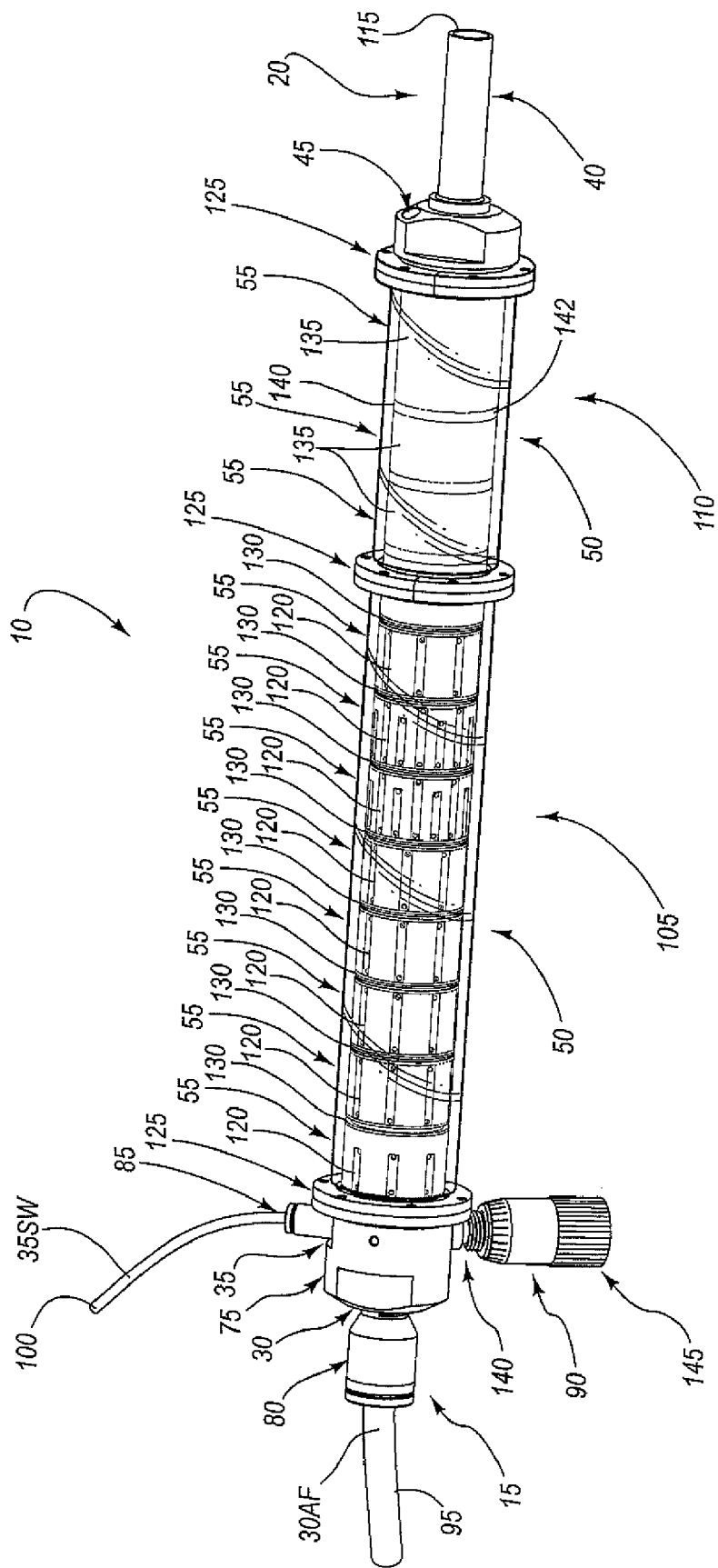
Figure 3:
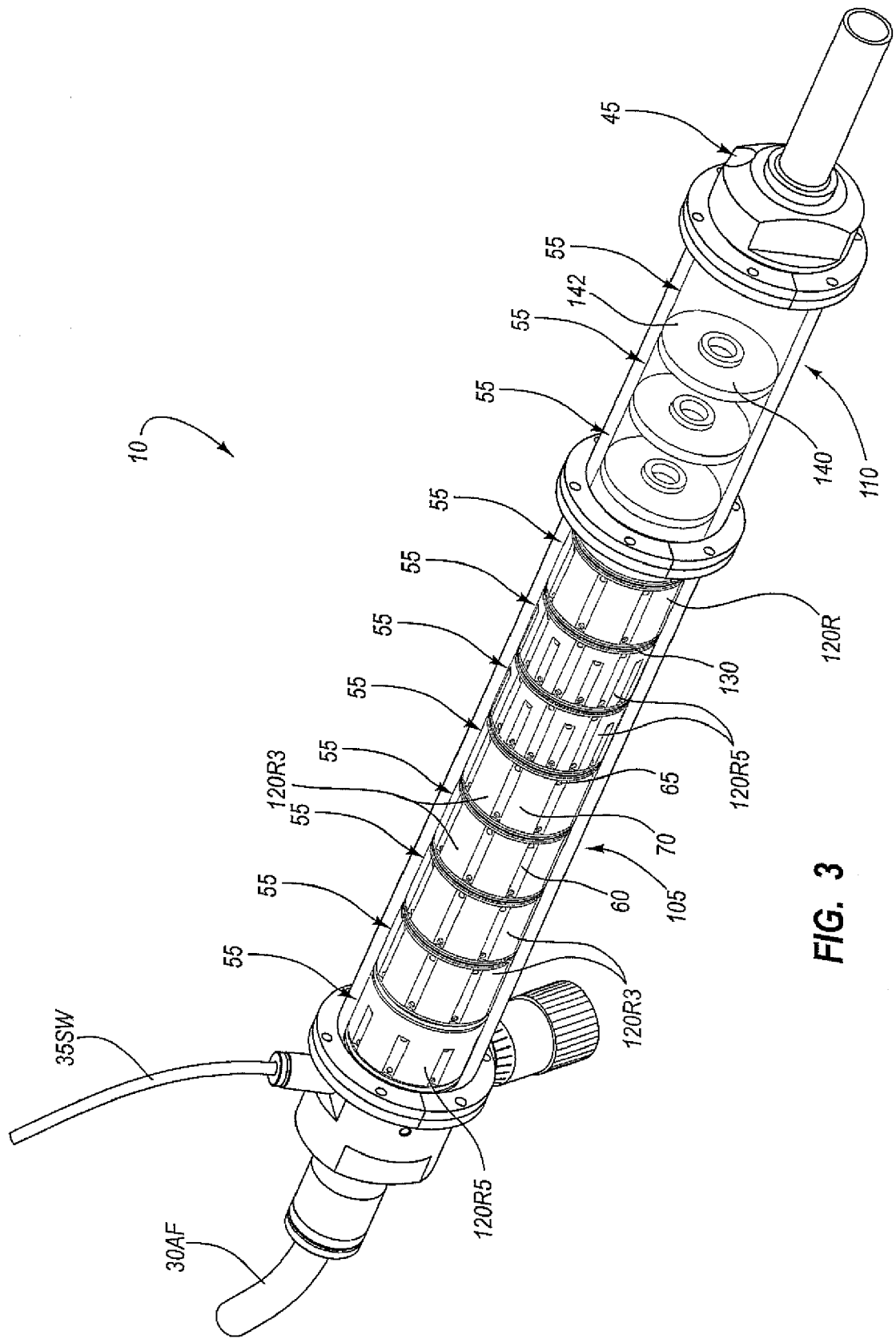
Figure 4:
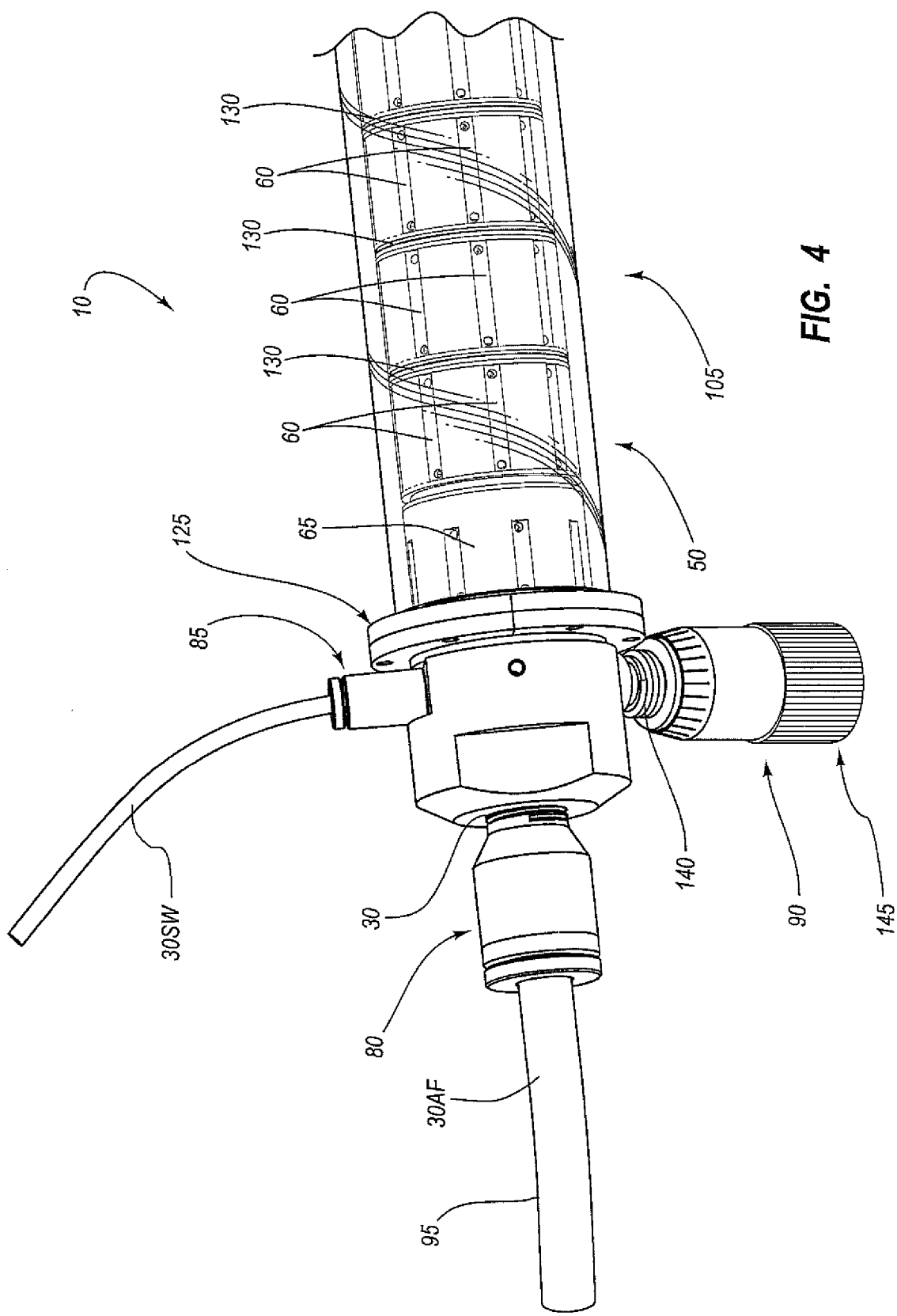
FIG. 4 illustrates the input portion of the desalinization device shown in FIGS. 1-3.
Figure 5:
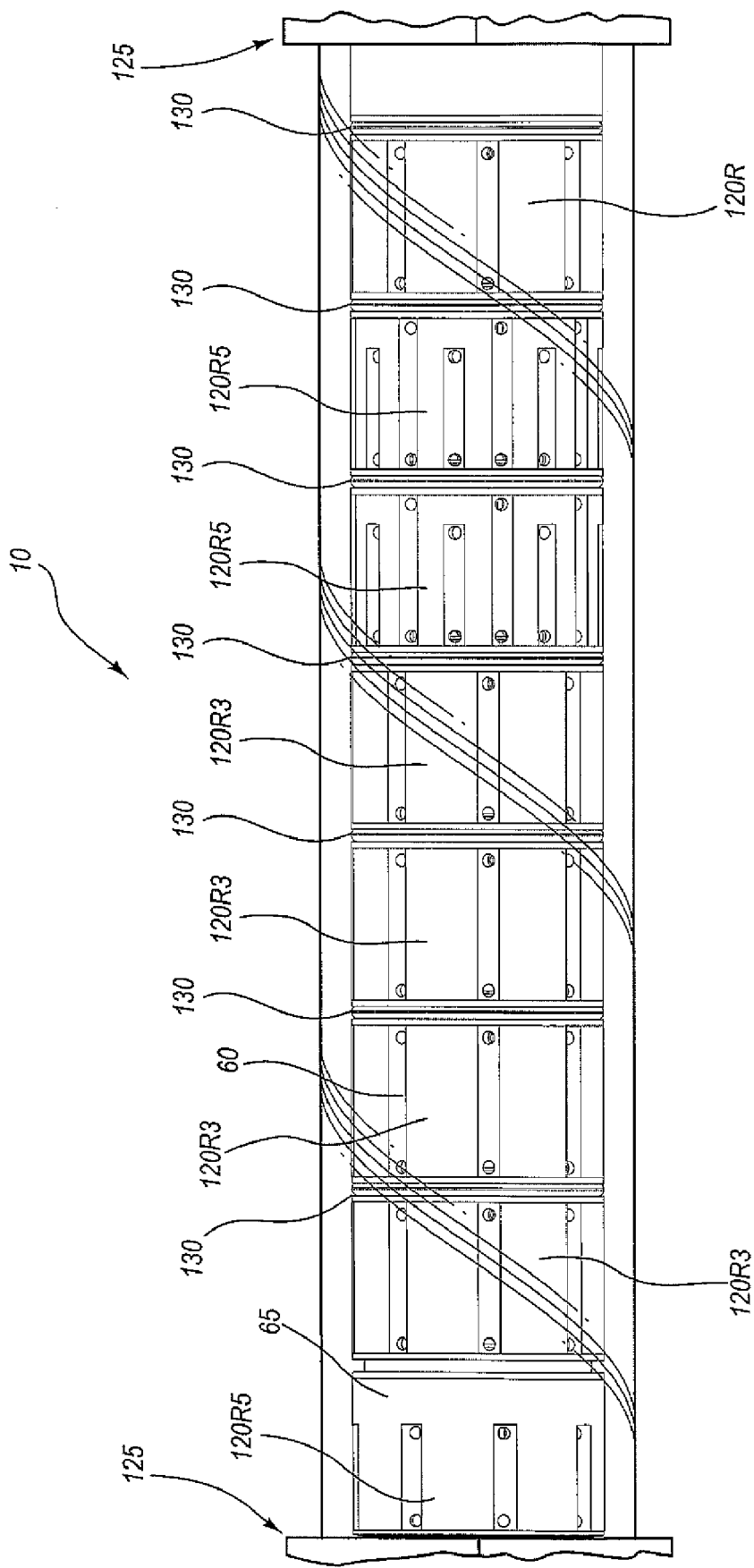
FIG. 5 illustrates an enlarged view of processing chambers in a processing section of the desalinization apparatus shown in FIGS. 1-3.

Turning now to the figures, and in particular to FIGS. 1-3, embodiments of a desalinization apparatus 10 are shown. For example, there may be provided a first end 15 and a second end 20 in opposition to one another. A line between first end 15 and the second end 20 forming an axis 25 (FIG. 1). First end 15 may form at least one port 30 for receiving airflow 30AF therethrough and at a pressure higher than an ambient atmospheric pressure. First end 15 may form at least one port 35 for receiving salt water 35SW therethrough and at a pressure higher than the ambient atmospheric pressure. Second end 20 may form at least one output 45 for providing outflow of pure water vapor, and the second end forming at least one output for proving outflow of a mixture of water, salt and air.

There may be provided at least one tube casing 50 extending between first end 15 and the second end 20. Tube casing 50 may enclose a plurality of chambers 55 (see FIGS. 2 and 3) for evaporating salt water 35SW into airflow 30AF, at least one of the chambers 55 may form a plurality of passageways 60 arranged substantially parallel to axis 25 between first end 15 and second end 20. A plurality of ports 65 from passageways 60 may be formed in at least one of the chambers 55.

Ports 65 may be arranged in a plurality of rows 70 substantially parallel to one another and substantially perpendicular to axis 25 between first end 15 and second end 20.

Still referring to FIGS. 1-3, first end 15 may include an input body 75 having an airflow connector 80, a fluid connector 85, and a valve assembly 90. Airflow connector 80 may be configured to receive tubing 95 for airflow 30AF provided thereto. Fluid connector 85 may be configured to receive tubing 100 for salt water 35SW provided thereto. Valve assembly 90 is configured to regulate flow of salt water 35SW provided thereto.

Airflow and salt water input may be adjusted for efficient evaporation within the desalinization apparatus. For example, airflow connector 80 may be configured to provide airflow 30AF at a pressure of about 80 psi into desalinization apparatus 10. Airflow connector 80 may be configured to provide airflow 30AF at a volume of about 10 to 50 cubic feet per minute (cfm.) Airflow connector 80 may be configured to provide airflow 30AF at a temperature of about 100° to 150° F.

Fluid connector 85 may be configured to provide salt water 35SW at a pressure of about 5 to 10 psi greater than the pressure of the airflow so as to provide a pressure differential to allow salt water 35SW to enter the airflow. In one embodiment, desalinization apparatus 10 may provide at least 10 ml per minute of water from the pure water vapor. In another embodiment, desalinization apparatus 10 may provide at least 13.5 ml per minute of water from the pure water vapor.

Output may provide to a passageway 115 in communication with a refrigerator to condense the water vapor into salt-free water. In one embodiment, output 45 may be configured for providing outflow of a mixture of water, salt and air is configured to provide the mixture to a separator bottle to further process the mixture into salt-free water. Referring to FIGS. 1-3, tube casing 50 may include a processing section 105 and a separator section 110 in fluid communication with one another. Processing section 105 may be configured to receive airflow 30AF and salt water 35 SW from first end 15. Processing section 105 may be configured to evaporate at least a portion of the salt water 35SW prior to the separator section 110. Separator section 110 may be configured to discharge water vapor to a passageway 115 in communication with a refrigerator to condense the water vapor into salt-free water and discharge a mixture of water, salt and air into a separate passageway 45 from the passageway 115 in communication with the refrigerator.

In order to evaporate water from the salt water into the airflow, processing section 105 directs the airflow and the salt water through ports 65 of chambers 55 to form at least one vortex about axis 25 so as to evaporate water vapor from the salt water into the airflow. For example, one or more processors in the device may be configured to create a pressure drop in the direction of airflow, and this pressure drop evaporates liquid into the airflow. In an exemplary embodiment, each of eight processors may provide a pressure drop so as to evaporate liquid. The pressure drop per processor may be within a range of 0.75 to 4 pounds per square inch (psi). In one embodiment, the plurality of chambers 55 forming processing section 105 may include different types of v-cups 120. The different types of v-cups 120 include a restrictive v-cup 102R, a 3 row v-cup 120R3, and a 5 row v-cup 120R5. Restrictive v-cup 120R may be configured to create a pressure drop of airflow 30AF and salt water 35SW therein. This increases pressure prior to restrictive v-cup 120R toward the first end 15 and allows airflow 30AF to hold additional water vapor. Processing section 105 may be configured to maximize evaporation of the salt water 35SW prior to the separator section 110.

Separator section 110 may be configured to prevent salt from being discharged from output 40 for providing outflow of pure water vapor. In an embodiment, processing section 105 may be configured to provide additional evaporation of the salt water prior to the second end 20.

One or more flanges 125 may be provided to connect processor section 105 and separator section 110 to input body 75 and output 40, respectively, as together with one another. In various embodiments, flanges 125 may be removable for cleaning or repairing desalinization apparatus 10. In alternative embodiments, flanges 125 may be integrally formed with tube casing 50 or omitted from desalinization apparatus 10.

As best illustrated in FIGS. 2 and 3, a ring 135 may be provided between beach of the chambers 55 around the distal end of each of the v-cups 120 (toward second end 20 of desalinization apparatus 10.) Ring 135 may be formed of a resilient material to function as a removable gasket. In other embodiments, chambers 55 may be formed in other fluid tight manners with respect to one another.

Figure 6:
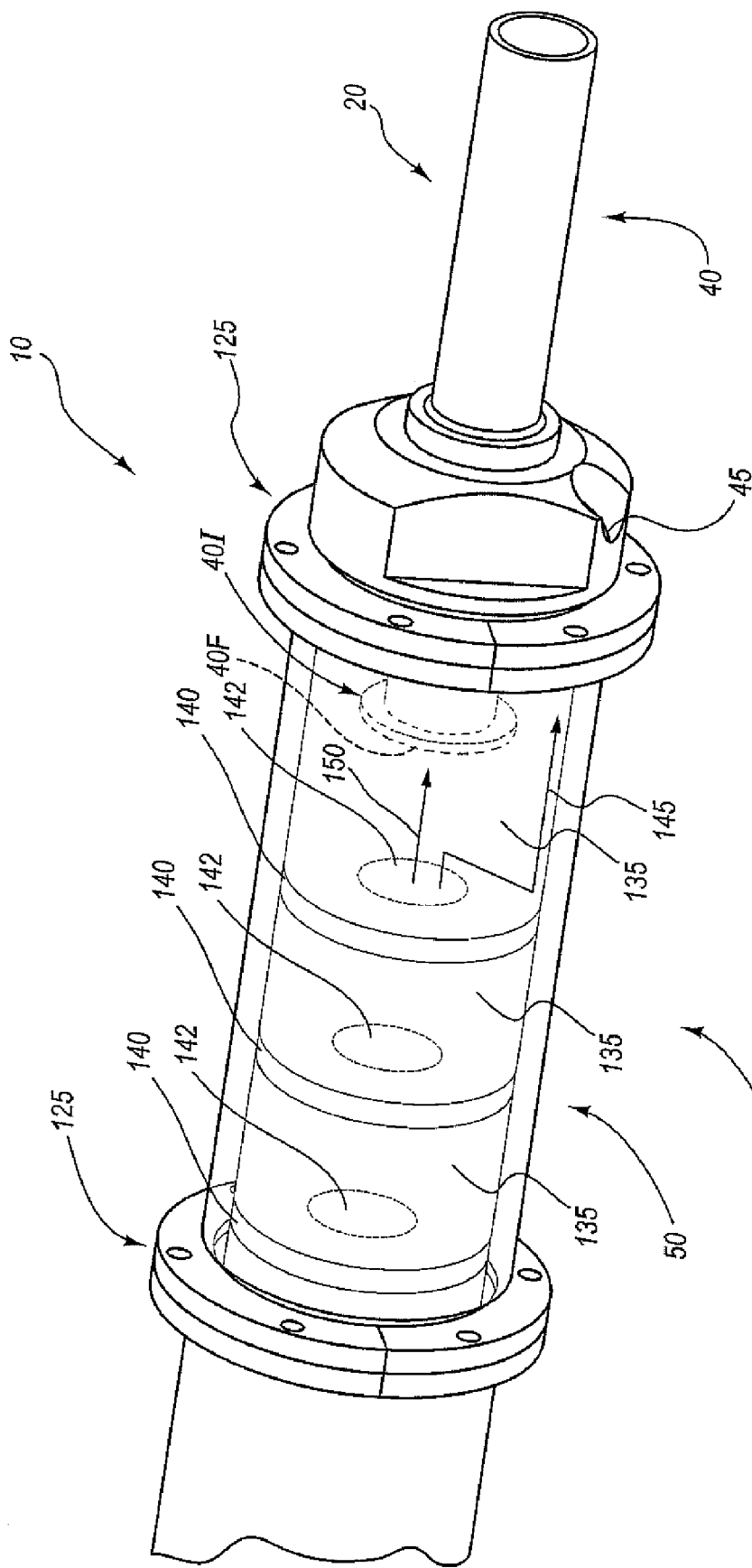
FIGS. 6 and 7 illustrate enlarged, perspective views of separator chambers in a separator section of the desalinization apparatus shown in FIGS. 1-3.
Figure 7:
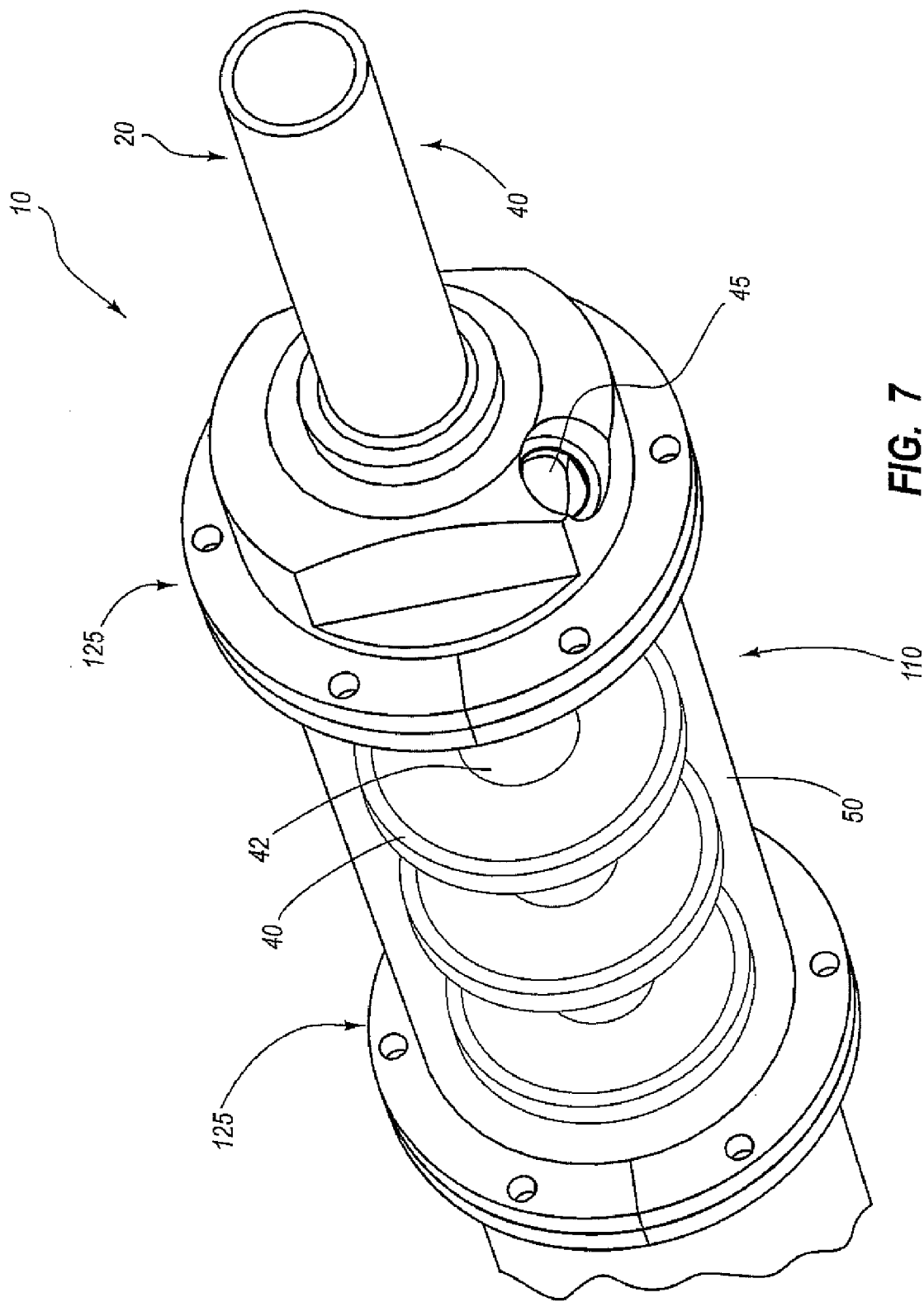

Referring to FIG. 6, there is shown a series of separator chambers 135. In an embodiment, one or more separator chambers 135 may be formed with partitions 140. An outlet 142 may be provided through each one of the partitions 140. Within separator chamber 135, flow of water with salt will generally follow path 145 and water vapor will generally follow path 150. The radius of outlets 142 creates these paths 145, 150 so as to prevent salt from entering output 40I. This configuration of the output 40I with a flange 40F avoids mixing of paths 145, 150 and allows collection of sediment, salt, and any other non-vapor materials to be separately collected through passageway 45. These materials pass through second end 20 and may be separately processed. Without flange 40F at outlet 40I, materials within path 145 may mix with path 150 so as to contaminate the water vapor within path 150. Looking now at FIG. 7, there is shown a perspective view of second end 20 with output 40 for water vapor. FIG. 7 illustrates output 45 for salt water and other contaminants.

Figure 8:
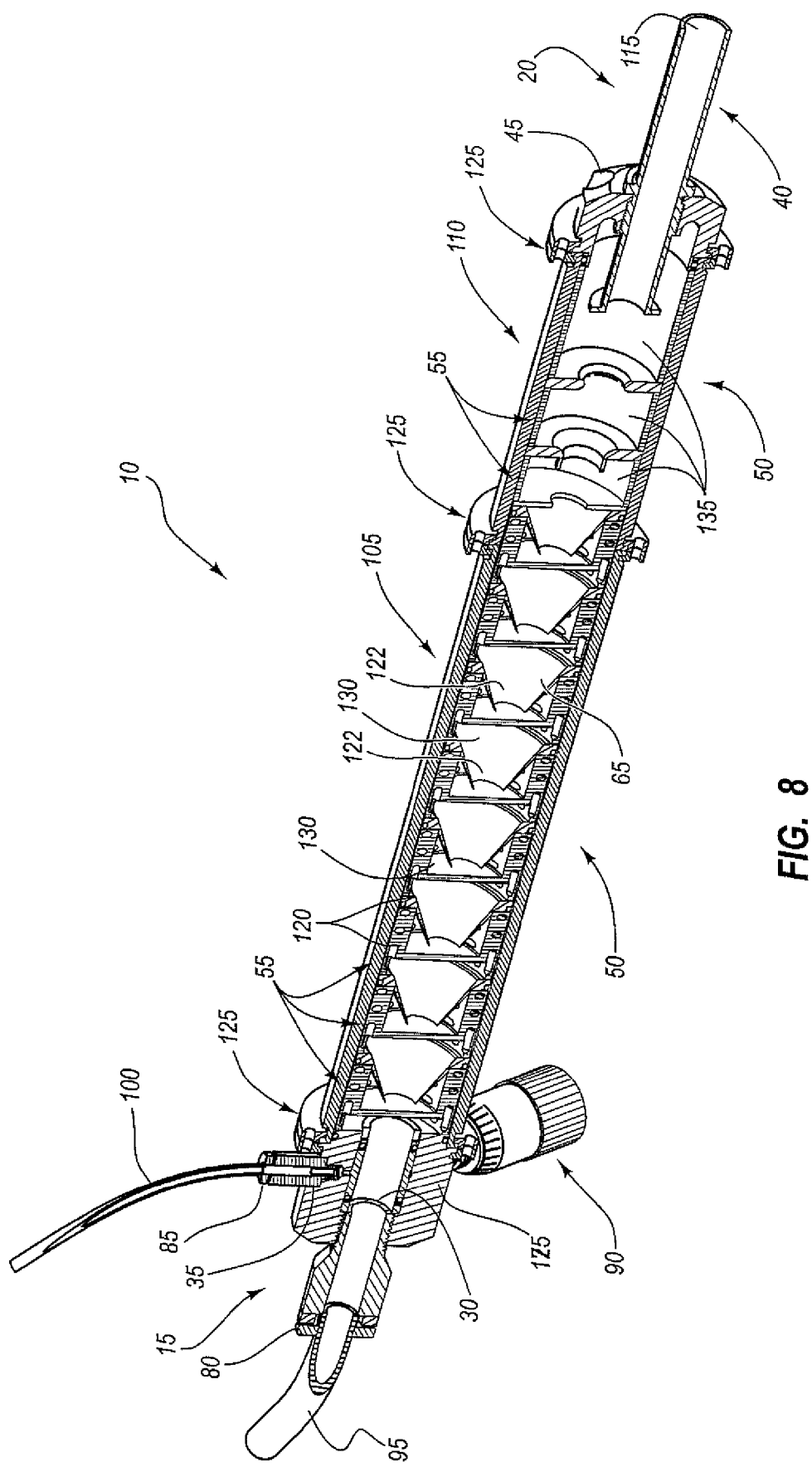
FIG. 8 is a cross-sectional view of the desalinization apparatus shown in FIGS. 1-3.

FIG. 8 illustrates a cross-sectional view of desalinization apparatus 10. Chambers 55 are shown with outlets 122 leading from a portion toward first end 15 to a subsequent chamber or separator section 110 toward second end 20. As described above, a vortex may be formed in each one of chambers 55 by airflow through the plurality of ports 65. Airflow together with salt water and any water vapor is received into each chamber 55 through passageways 60 from a portion toward first end 15 into the plurality of rows 70. After traveling though ports 65 and forming a vortex, airflow continues to travel toward second end 20 through outlet 122.

Figure 10:
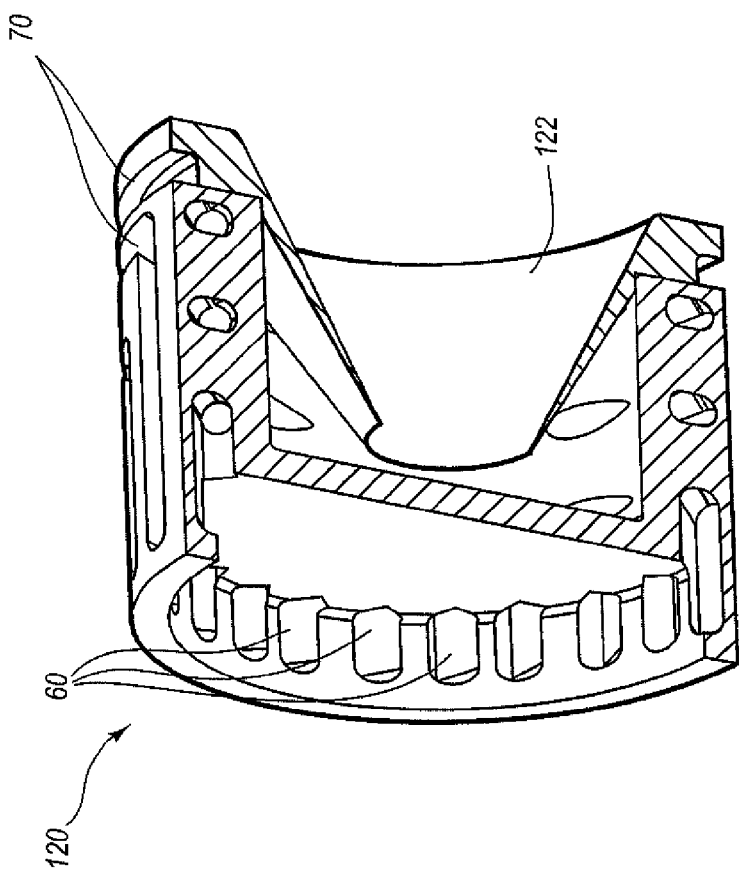
FIGS. 9-16 illustrate various cross-sectional views of v-cup configurations within the chamber of processing section of the desalinization apparatus shown in FIGS. 1-3.
Figure 9:
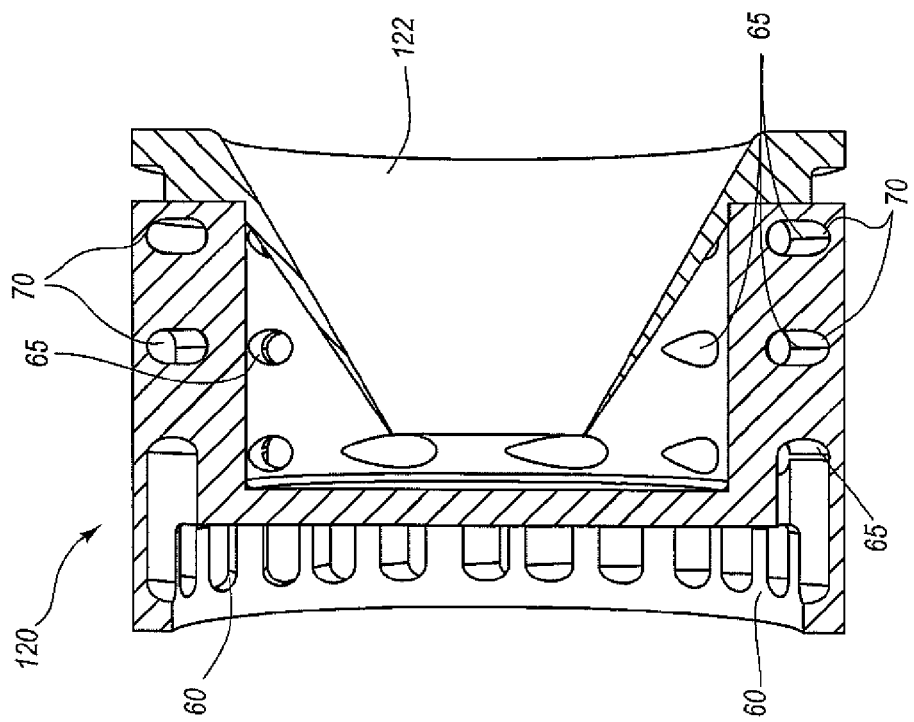

An exemplary embodiment of this configuration can also be seen in FIG. 9. From left to right, in the same direction as illustrated in FIGS. 1-8, airflow carrying salt water, together with any particulate matter and vapor, enters v-cup 120 through passageways 60. Airflow is next directed through a plurality of ports 65 to form a vortex. Airflow subsequently emerges from outlet 122 for processing within another v-cup 120 or separator section 110. FIG. 10 illustrates airflow passageways 60 and rows 70 in an orthogonal relationship with one another. Alternatively, passageways 60 and rows 70 may be configured at another angle with respect to one another.

Figure 12:
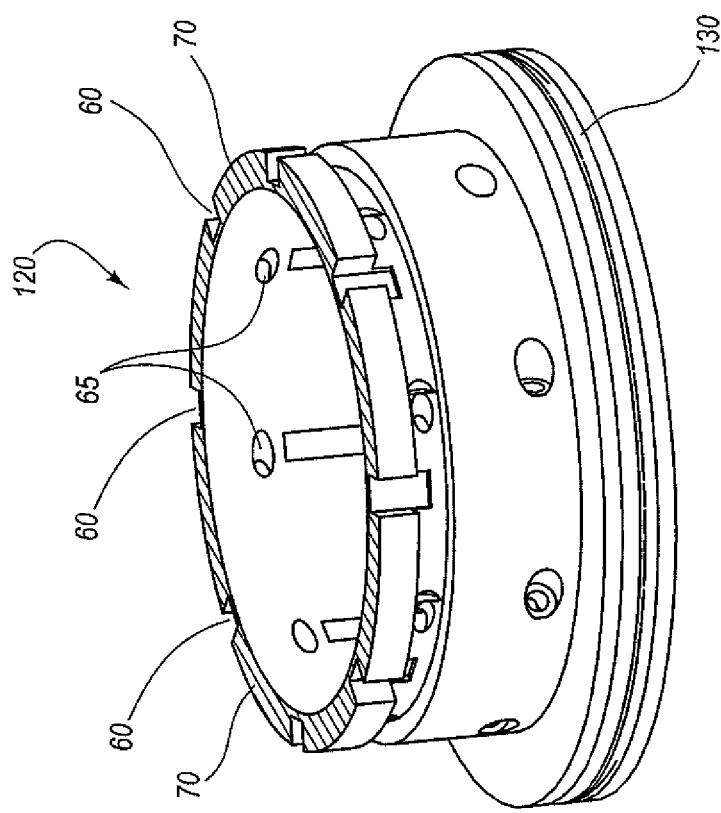
Figure 11:
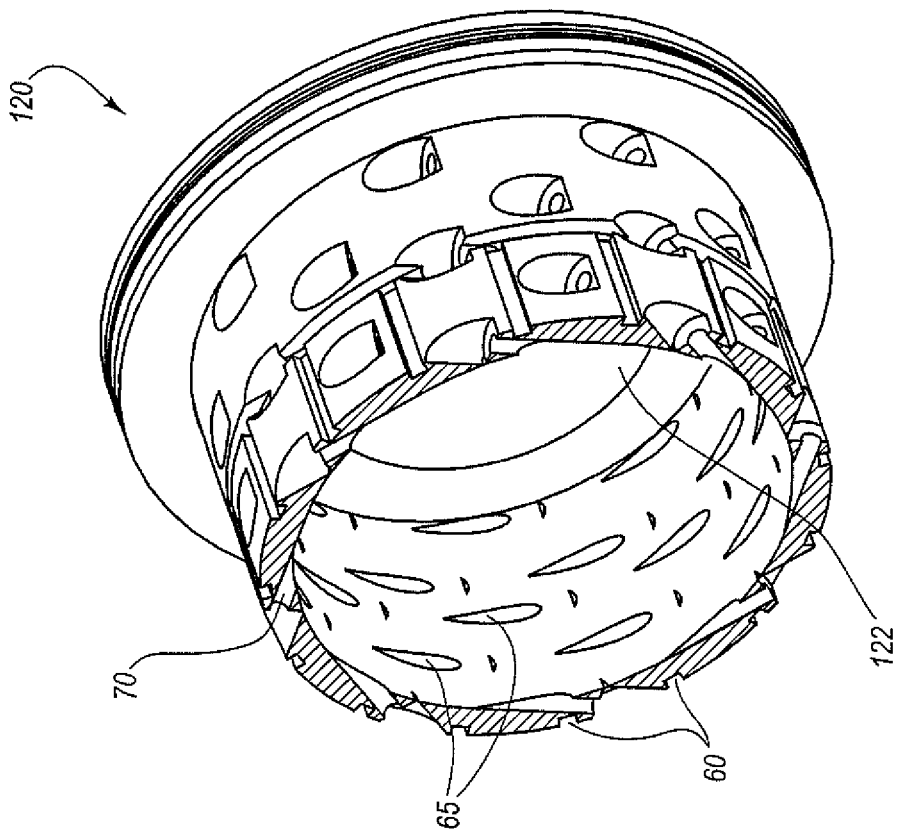
Figure 14:
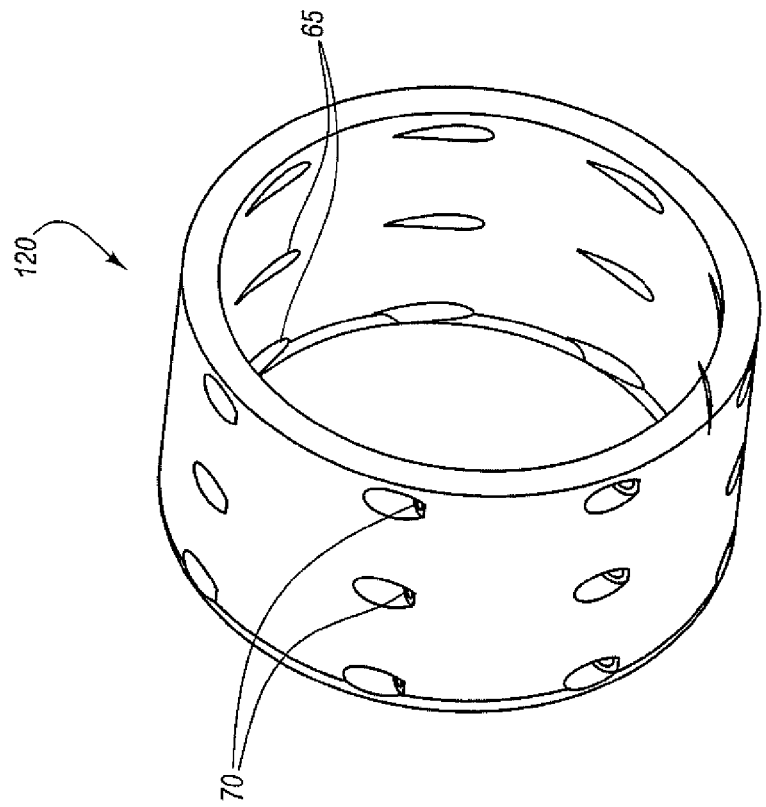
Figure 13:
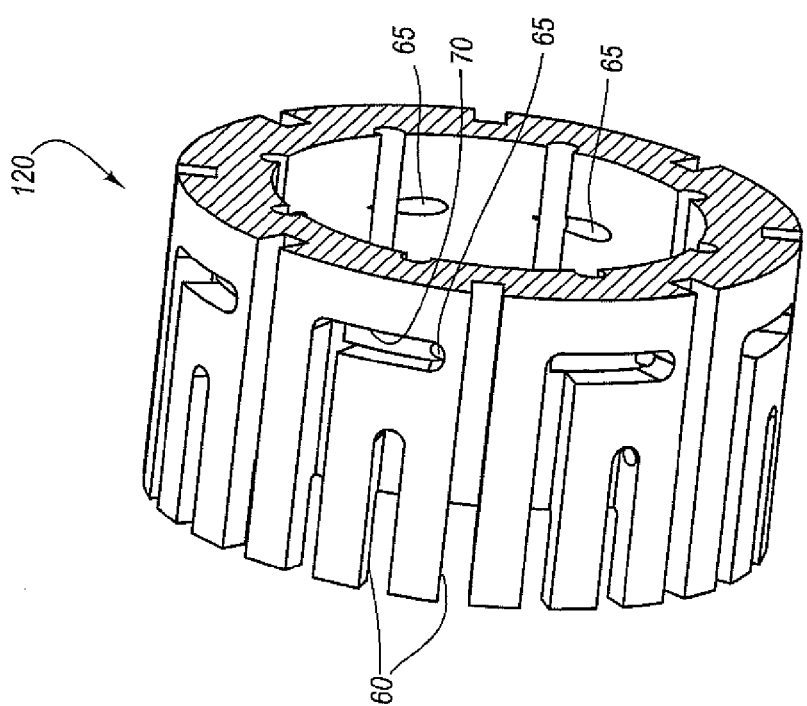

Referring to FIG. 11, there is illustrated a perspective view with a cross-section of v-cup 120 removed toward first end 15. From the inside of v-cup 120, outlet 122 toward second end 20 is visible. In addition, there are shown ports 65 as well as passageways 65 and rows 70 for directing airflow into the inside of cut 120. FIG. 12 provides a similar illustration of v-cup 120 as FIG. 11. In this view, outlet 122 is not visible, but ring 130 is provided in the groove at the end of v-cup 120 toward second end 20. FIG. 13 is another view in which the cross-sectional view looks within v-cup 120 toward first end 15. Passageways 60 and rows 70 leading to ports 65 are shown in FIG. 13. In one embodiment, v-cup 120 may include ports 65 in communication with rows 70 as illustrated in FIG. 14.

Figure 15:
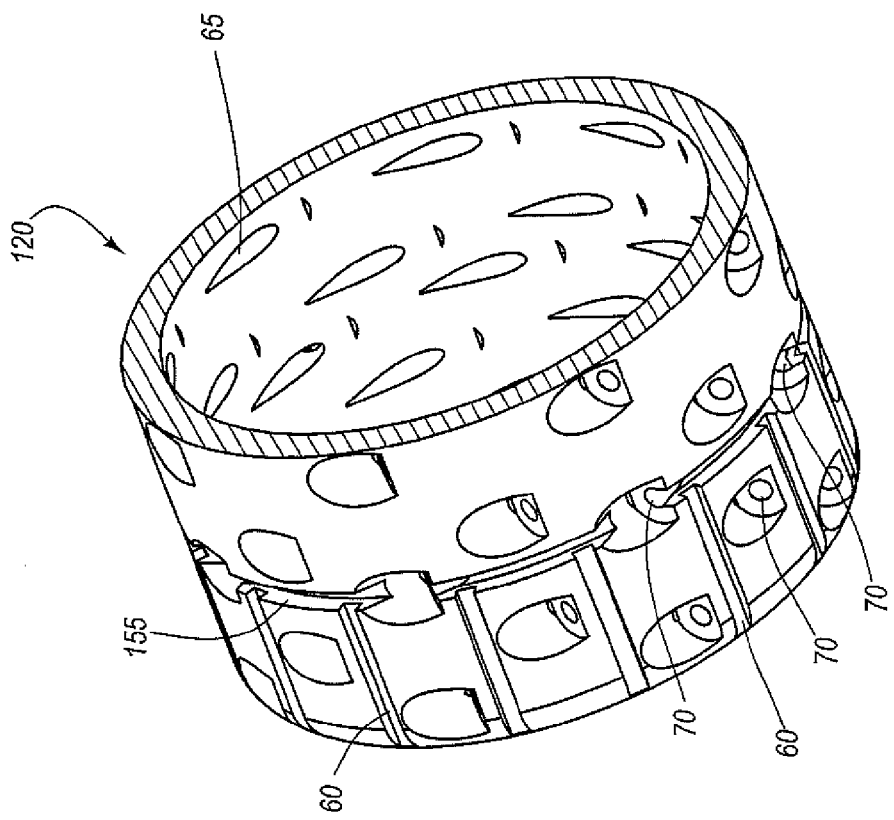

Looking at FIG. 15, and in one embodiment, an inside track 155 may be provided to feed tangential passageways 70 from passageways 60. With this configuration, a lower resistance v-cup 120 having either 5 rows or 3 rows of ports 65 may be provided.

Figure 16:
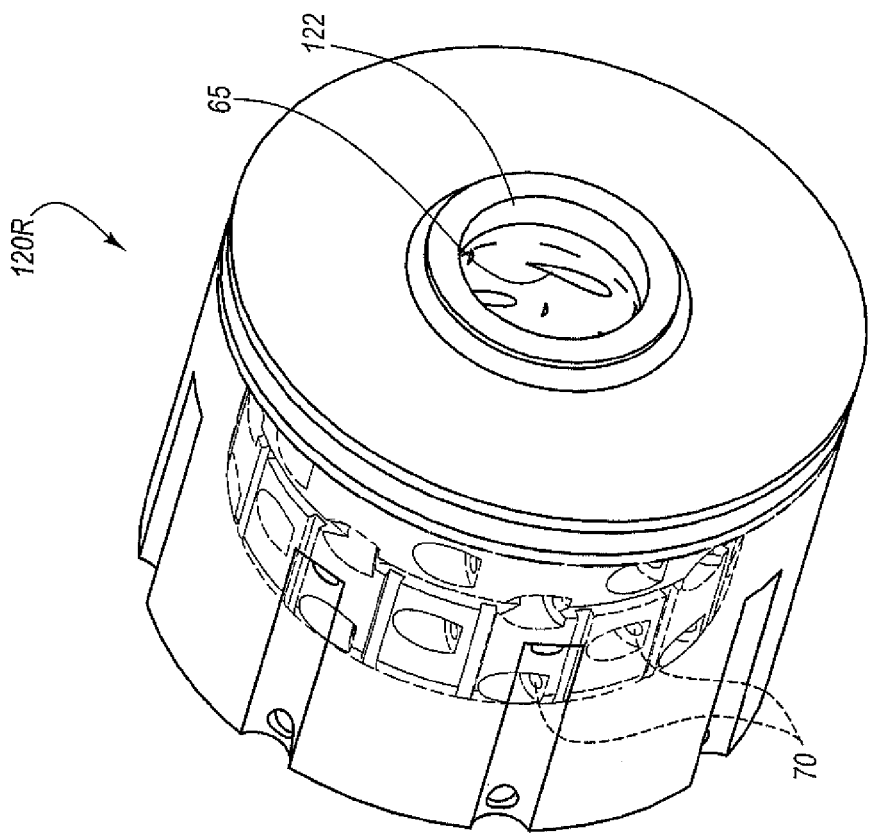
Figure 18:
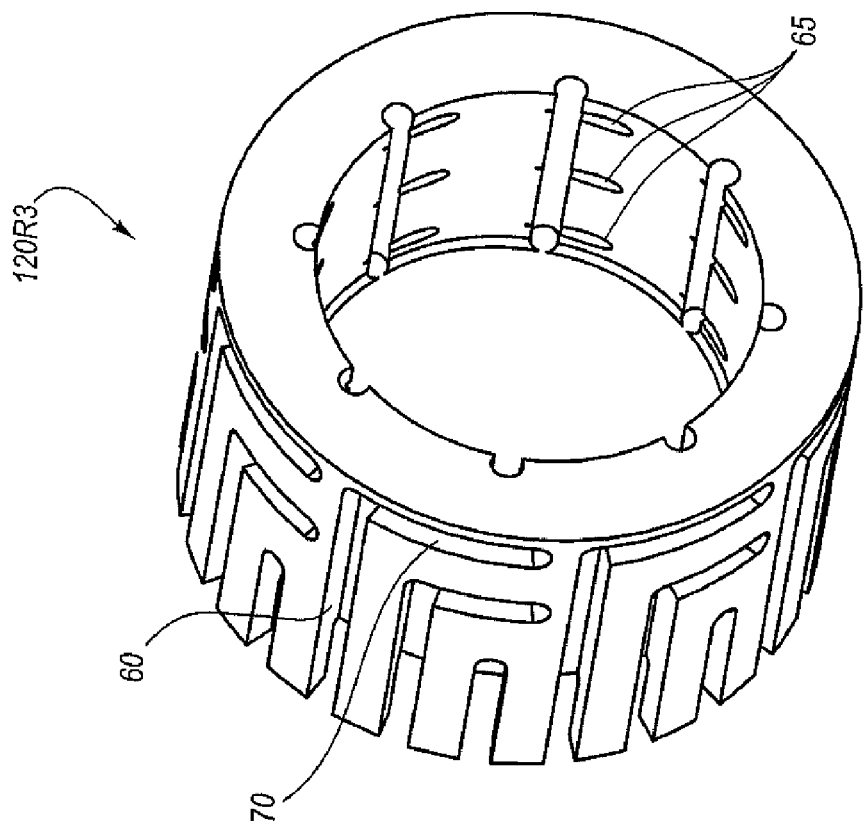
FIGS. 17-19 illustrate a three row v-cup from one of the chambers of the processing section of the desalinization apparatus shown in FIGS. 1-3.
Figure 17:
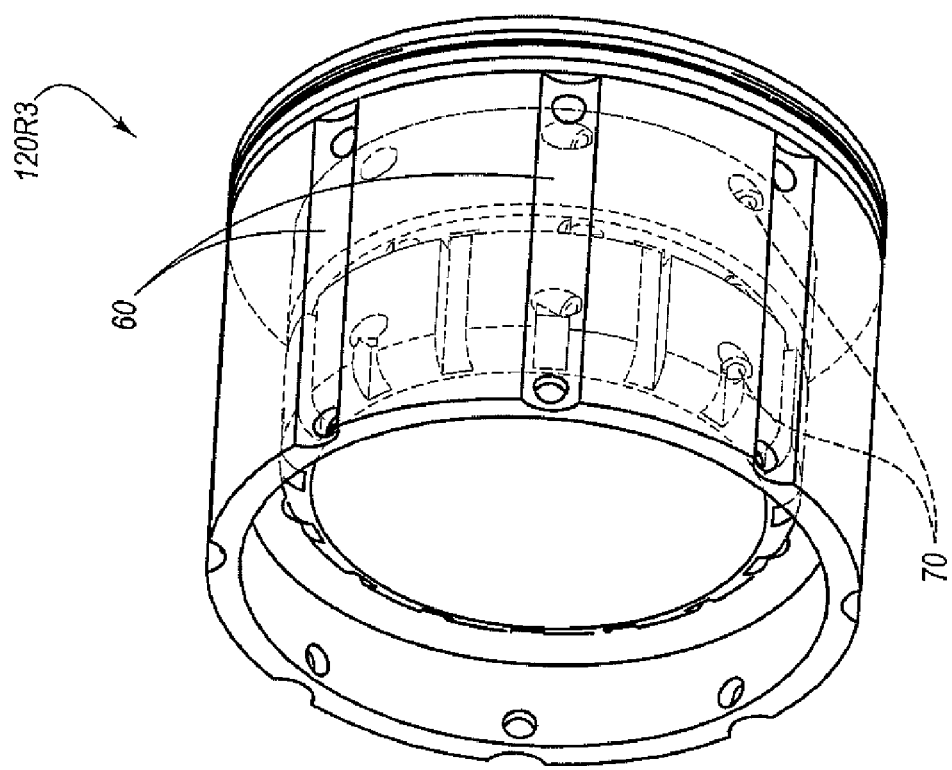
Figure 20:
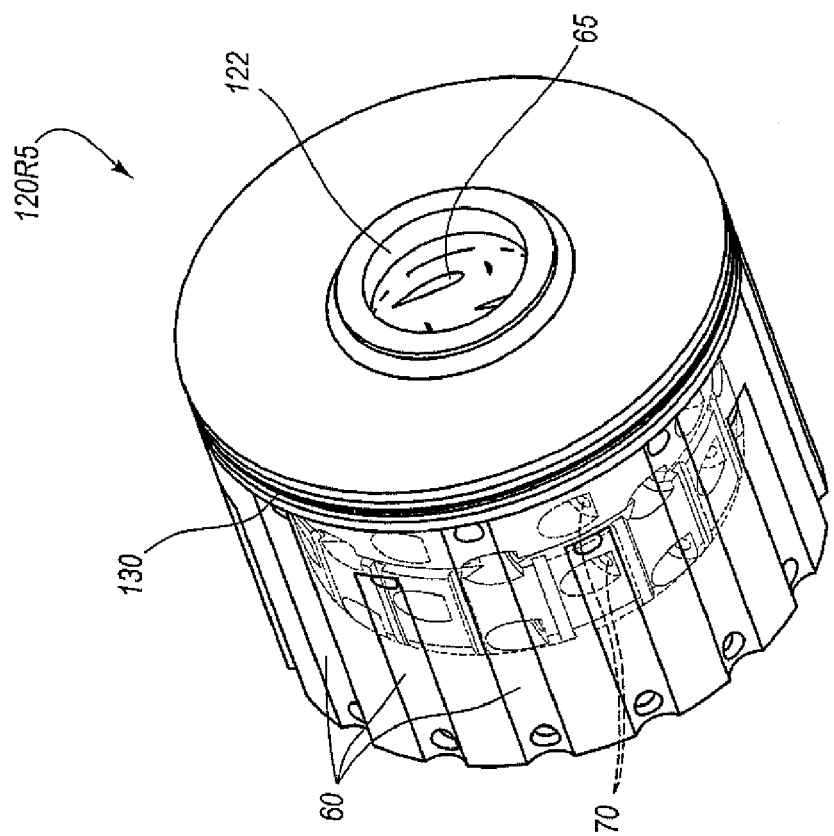
FIGS. 20 and 21 a five row v-cup from one of the chambers of the processing section of the desalinization apparatus shown in FIGS. 1-3.
Figure 19:
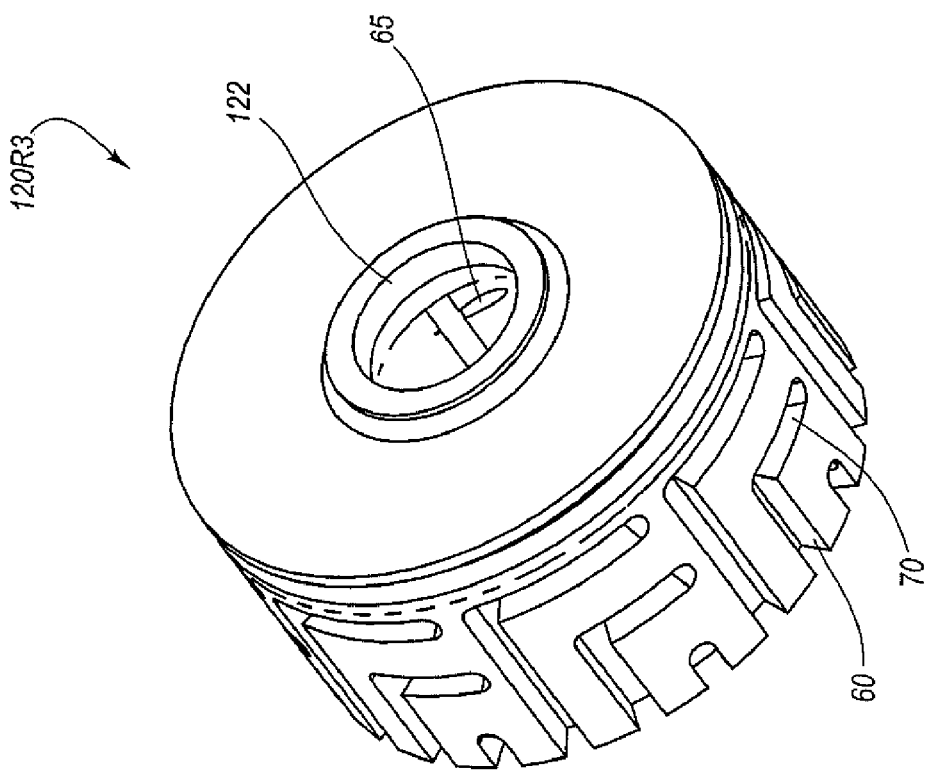

A restrictive v-cup 120R is illustrated in FIG. 16. A three row v-cup 120R3 is illustrated in FIGS. 17-19. A five row v-cup 120R5 is illustrated in FIGS. 20 and 22.

Figure 22:
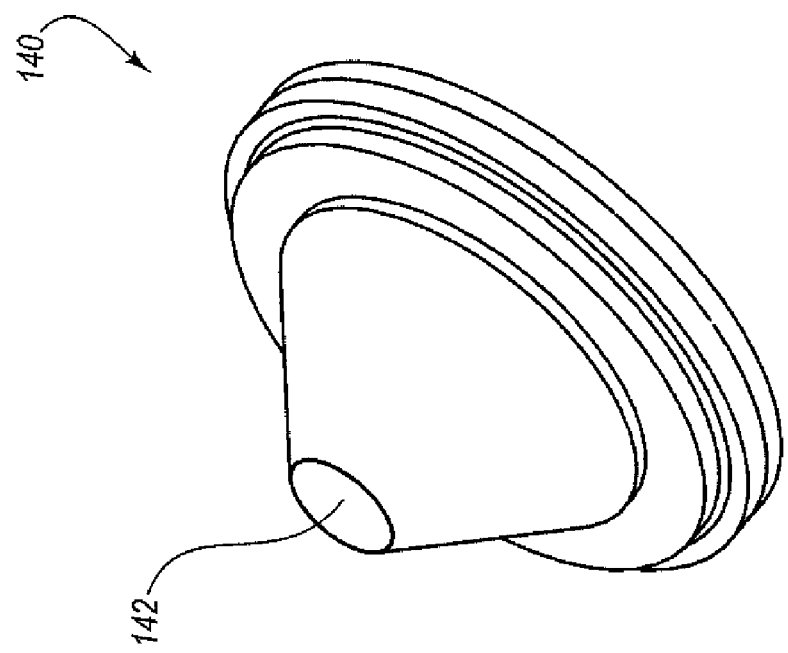
FIG. 22 illustrates a partition from one of the separation chambers of the separation section of the desalinization apparatus shown in FIGS. 1-3.
Figure 21:
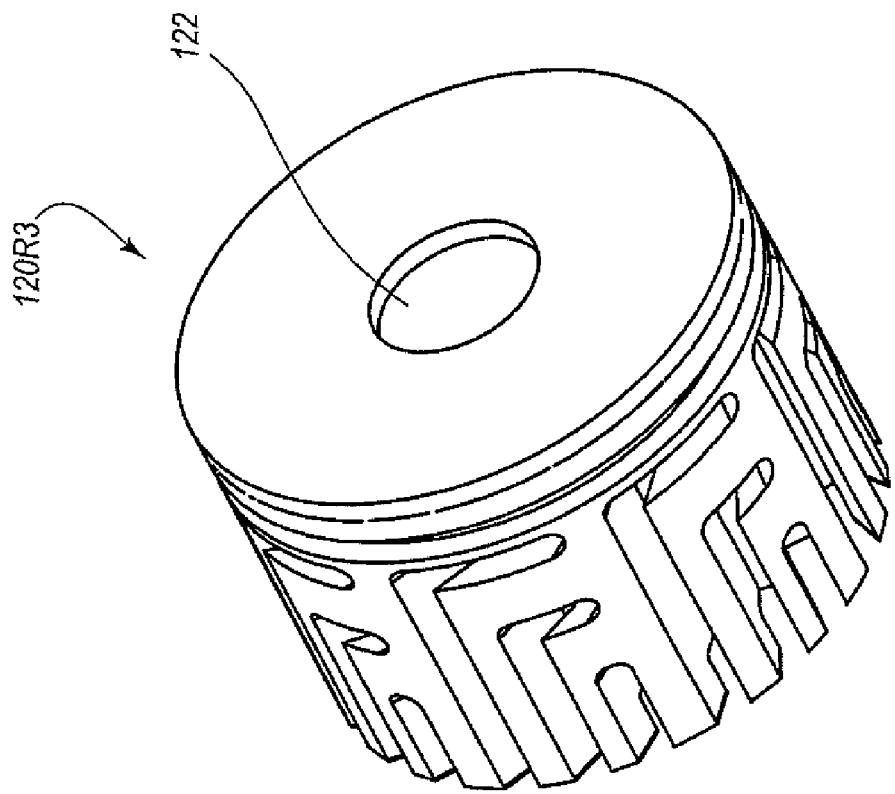

FIG. 22 is a perspective view of partition 140 with outlet 142 having a flange for preventing mixing and backflow of water vapor and other fluids and materials in a separation chamber.

Figure 23:
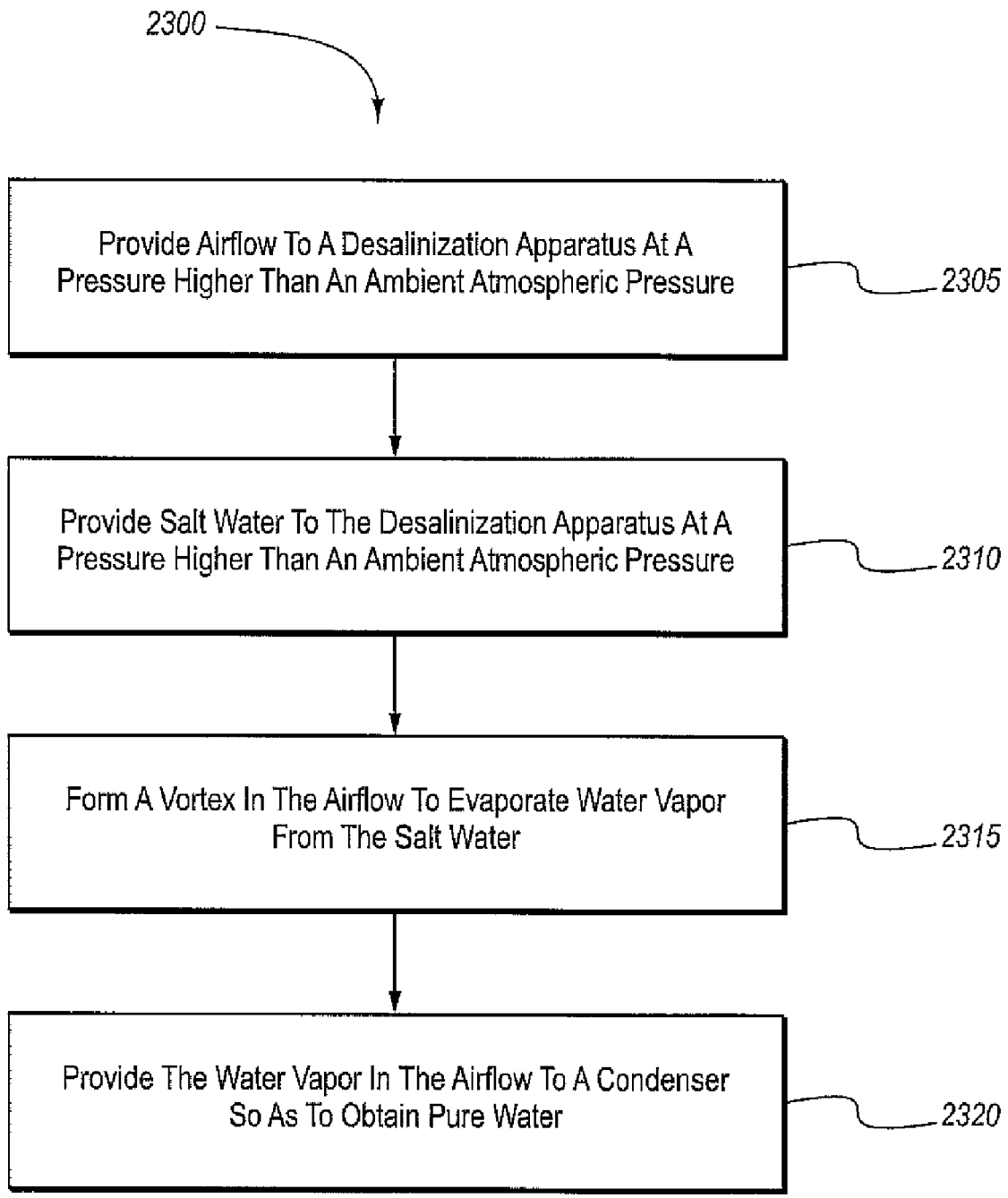
FIG. 23 is a schematic diagram of a desalinization process according to one embodiment of the invention.

Referring now to FIG. 23, there is shown an exemplary method 2300 related to desalinization of salt water. Method 2300 may include providing 2305 airflow to a desalinization apparatus at a pressure higher than an ambient atmospheric pressure. Method 2300 may further include providing 2310 salt water to the desalinization apparatus at a pressure higher than an ambient atmospheric pressure. Method 2300 may also include forming 2315 a vortex in the airflow to evaporate water vapor from the salt water. Method 2300 may include providing 2320 the water vapor in the airflow to a condenser so as to obtain pure water.

In an embodiment, method 2300 may include forming the vortex occurs in a chamber. For example, this may include forming a plurality of vortices in a plurality of chambers in series with one another prior to providing the water vapor in the airflow to the condenser.

Method 2300 may also include regulating flow of the airflow to the desalinization device. Airflow into the desalinization apparatus may be provided at a pressure of about 80 psi. Airflow into the desalinization apparatus may be provided at a volume of about 10 to 50 cfm. Airflow into the desalinization apparatus may be provided at a temperature of about 100° to 150° F.

Method 2300 may also include regulating flow of the salt water into the desalinization device. Salt water into the desalinization apparatus may be provided at a pressure of about 5 to 10 psi greater than the pressure of the airflow so as to provide a pressure differential to allow the salt water to enter the airflow. Using the above-identified specifications, for example, the desalinization apparatus may provide at least 10 ml per minute of water from the pure water vapor. However, the desalinization apparatus may provide at least 13.5 ml per minute of water from the pure water vapor.

What is claimed is:

1. A method, comprising:
   providing a desalinization apparatus comprising a chamber;
   directing airflow to the desalinization apparatus at a pressure higher than an ambient atmospheric pressure;
   directing salt water to the desalinization apparatus at a pressure higher than an ambient atmospheric pressure;
   forming a vortex in the airflow within the chamber and delivering the salt water into the vortex to evaporate water vapor from the salt water; and
   delivering the water vapor in the airflow to a condenser to obtain purified water.

2. A method according to claim 1 further comprising forming a plurality of vortices in a plurality of chambers in series with one another prior to delivering the water vapor in the airflow to the condenser.

3. A method according to claim 1 further comprising regulating flow of the salt water to the desalinization device.

4. A method according to claim 1 wherein the airflow into the desalinization apparatus has a pressure of about 80 psi.

5. A method according to claim 1 wherein the airflow into the desalinization apparatus has a volume of about 10 to 50 cfm.

6. A method according to claim 1 wherein the airflow into the desalinization apparatus has a temperature of about 100° F. to 150° F.

7. A method according to claim 1 wherein the salt water into the desalinization apparatus has a pressure of about 5 to 10 psi greater than the pressure of the airflow so as to provide a pressure differential to allow the salt water to enter the airflow.

8. A method according to claim 1 wherein the desalinization apparatus provides at least 10 ml per minute of water from the water vapor.

9. A method according to claim 1 wherein the desalinization apparatus provides at least 13.5 ml per minute of water from the water vapor.

10. A method, comprising:
    providing a desalinization apparatus comprising a chamber having a longitudinal axis;
    directing airflow to the chamber in a direction perpendicular to the longitudinal axis to create a vortex of airflow in the chamber;
    directing salt water into the vortex;
    evaporating water in the vortex to create water vapor from the salt water;
    delivering the water vapor to a condenser to obtain purified water.

11. A method according to claim 10 further comprising forming a plurality of vortices in a plurality of chambers in series with one another prior to delivering the water vapor in the airflow to the condenser.

12. A method according to claim 10 further comprising regulating flow of the salt water to the desalinization device.

13. A method according to claim 10 wherein the airflow into the desalinization apparatus has a pressure of about 80 psi.

14. A method according to claim 10 wherein the airflow into the desalinization apparatus has a volume of about 10 to 50 cfm.

15. A method according to claim 10 wherein the airflow into the desalinization apparatus has a temperature of about 100° F. to 150° F.

16. A method according to claim 10 wherein the salt water into the desalinization apparatus has a pressure of about 5 to 10 psi greater than the pressure of the airflow so as to provide a pressure differential to allow the salt water to enter the airflow.

17. A method according to claim 10 wherein the desalinization apparatus provides at least 10 ml per minute of water from the water vapor.

18. A method according to claim 10, wherein the airflow and salt water are supplied at a pressure higher than an ambient atmospheric pressure.

19. A method according to claim 10, wherein directing salt water into the vortex includes directing the salt water in a direction perpendicular to the longitudinal axis.

20. A method, comprising:
providing a desalinization apparatus comprising a chamber;
directing airflow to the desalinization apparatus at a pressure higher than an ambient atmospheric pressure;
directing salt water to the desalinization apparatus at a pressure higher than an ambient atmospheric pressure;
creating a mixture of the airflow and the salt water in the desalinization apparatus;
directing the mixture into the chamber to form a vortex to evaporate water vapor from the salt water;
delivering the water vapor in the airflow to a condenser so as to obtain purified water.

21. A method according to claim 20 further comprising forming a plurality of vortices in a plurality of chambers in series with one another prior to delivering the water vapor in the airflow to the condenser.

22. A method according to claim 20 further comprising regulating flow of the salt water to the desalinization device.

23. A method according to claim 20 wherein the airflow into the desalinization apparatus has a pressure of about 80 psi.

24. A method according to claim 20 wherein the airflow into the desalinization apparatus has a volume of about 10 to 50 cfm.

25. A method according to claim 20 wherein the airflow into the desalinization apparatus has a temperature of about 100° F. to 150° F.

26. A method according to claim 20 wherein the salt water into the desalinization apparatus has a pressure of about 5 to 10 psi greater than the pressure of the airflow so as to provide a pressure differential to allow the salt water to enter the airflow.

27. A method according to claim 20 wherein the desalinization apparatus provides at least 10 ml per minute of water from the water vapor.

* * * * *